United States Patent [19]

Kawabata

[11] Patent Number: 5,360,639
[45] Date of Patent: Nov. 1, 1994

[54] METHOD OF PROVIDING A DECORATIVE PATTERN ON A SCREW HEAD

[76] Inventor: Kenji Kawabata, 4-9-11, Kizuri, Higashi-Osaka, Osaka Prefecture, Japan

[21] Appl. No.: 107,006

[22] Filed: Aug. 17, 1993

[30] Foreign Application Priority Data

Sep. 1, 1992 [JP] Japan .................... 4-259131

[51] Int. Cl.⁵ ............................... B05D 5/06
[52] U.S. Cl. ........................ 427/270; 427/277; 427/278; 470/9
[58] Field of Search ............ 427/271, 275, 276, 277, 427/278, 198, 270; 205/221; 29/527.2; 470/5, 9; 411/13, 14, 377, 902, 903, 914

[56] References Cited

U.S. PATENT DOCUMENTS

| | | | |
|---|---|---|---|
| 2,326,455 | 8/1943 | Gray | 411/914 |
| 3,592,100 | 7/1971 | Mackiewicz | 470/9 |
| 3,693,495 | 9/1972 | Wagner | 411/377 |
| 3,907,608 | 9/1975 | Barrett et al. | 148/268 |

FOREIGN PATENT DOCUMENTS 4-143263  5/1992  Japan .

*Primary Examiner*—Terry J. Owens
*Attorney, Agent, or Firm*—Mason, Fenwick & Lawrence

[57] ABSTRACT

A decorative screw is manufactured by forming a three-dimensional pattern on the whole surface of the head of a screw, depositing a coating or plating film on the whole surface of the pattern and grinding the projecting areas of the pattern to provide the screw head with a decorative three-dimensional pattern.

6 Claims, 5 Drawing Sheets

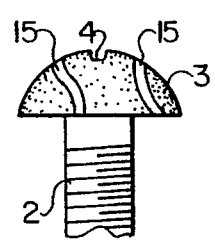
FIG. 8(a')
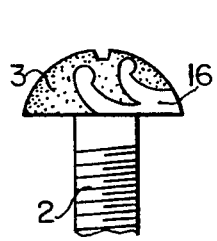
FIG. 8(b')
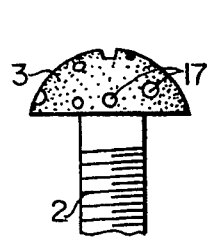
FIG. 8(c')
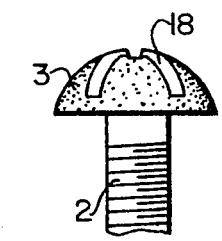
FIG. 8(d')

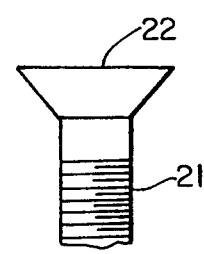
FIG. 8(e')
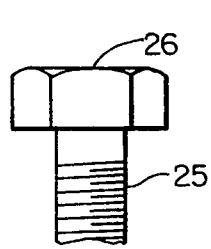
FIG. 8(f')
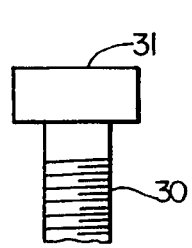
FIG. 8(g')
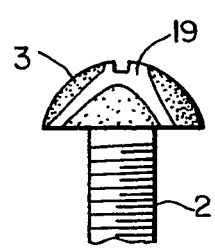
FIG. 8(h')

METHOD OF PROVIDING A DECORATIVE PATTERN ON A SCREW HEAD

FIELD OF THE INVENTION

The present invention relates to a method of manufacturing a decorative fastener, typically a round countersunk head setscrew or setbolt, the head of which is formed with an attractive pattern.

DESCRIPTION OF THE RELATED ART

A variety of screws and bolts have been manufactured for different uses. The popular ISO and other screws, the head of which has a diameter about twice the major diameter of the thread, include round countersunk head setscrews, flat countersunk head setscrews, pan head setscrews and so on. The head of such a screw is provided with a slot or a cross recess, and screws made of iron are usually plated for rust inhibition.

However, these screws have the disadvantage that when they are threaded into structural members, their exposed heads, which are metallic, do not blend well with the surrounding atmosphere to present an awkward appearance.

To overcome this disadvantage, screws with colored heads have for some time been available on the market in several different colors such as red and blue but since these screws have monotonous solid colors, they are not pleasing to the eye and even when color matching is carried out in the field, a satisfactory harmonization with the environmental-color tone can hardly been obtained. The present invention has for its object to overcome the above-mentioned disadvantage of the prior art screw.

SUMMARY OF THE INVENTION

The present invention, made to accomplish the above object, is characterized in that the whole surface area of the head of a screw is first formed with a three-dimensional pattern and, after deposition of a film on the surface, the projecting area or areas of the pattern are buffed or ground to create an attractive three-dimensional pattern. The film mentioned above is preferably a coating film or a plating layer. If desired, the whole area of the head so provided with a three-dimensional pattern may be treated with a rust inhibitor.

The present invention thus provides a highly decorative screw having a three-dimensional pattern on the head. In application, a screw best matching with the background, in pattern and color, can be selectively employed.

DETAILED DESCRIPTION OF THE PREFERRED EMBODIMENTS

Figure 1A:
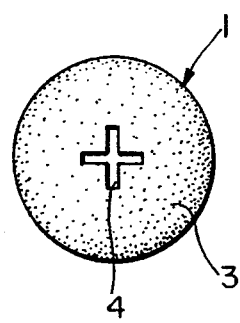
FIG. 1 is a view illustrating the surface treatment according to an embodiment of the invention.
Figure 1B:
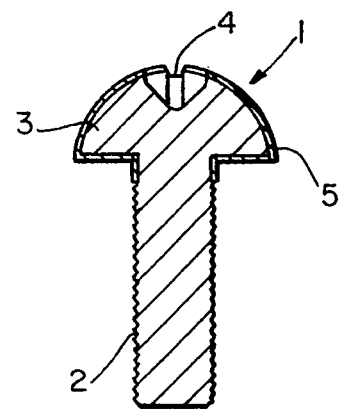
Figure 2A:
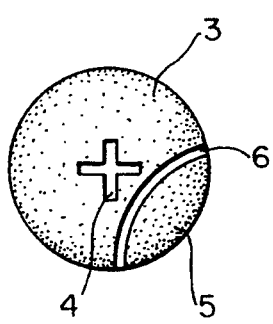
FIG. 2 is a view illustrating the grinding process according to the same embodiment.
Figure 2B:
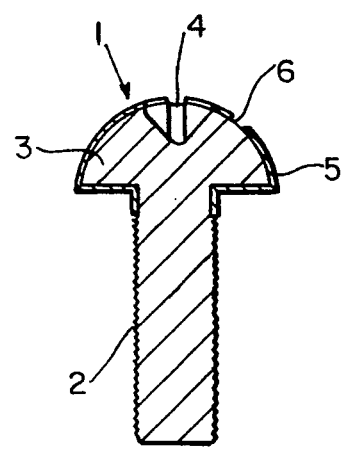
Figure 3A:
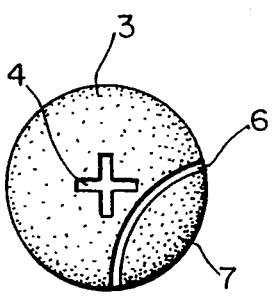
FIG. 3 is a view illustrating the rust inhibition treatment according to the same embodiment.
Figure 3B:
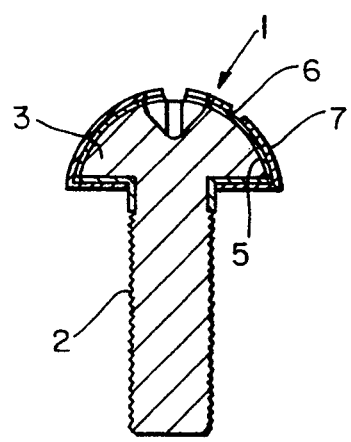

FIGS. 1 through 3 are views illustrating the basic process for the production of a decorative screw according to the invention.

While the decorative screw manufacturing process of the present invention is applicable to the production of various kinds of decorative screws and bolts, the mode of providing the head of a round countersunk head setscrew with a decorative three-dimensional pattern is now described in the following description of preferred embodiments.

As illustrated in FIG. 1 (a), the substrate screw can be a commercial round countersunk head setscrew 1 having a head 3 provided with a cross recess 4 and having a diameter at least about twice the major diameter of its thread (see FIG. 1 (b)). When made of iron, the setscrew as a whole has been treated with a rust inhibitor.

First, the head 3 of this screw 1 is surface-treated. This surface treatment is carried out by coating the head 3 with a colored coating composition or dipping the screw as a whole in a plating bath which is not shown. By this procedure, a coating or plating layer 5 is formed on the head 3 of the screw 1.

Then, this coated or plated surface of the screw head is locally ground to provide a desired three-dimensional pattern. This grinding operation may be manual or automatic, e.g. using a grinding machine. In the manual operation, a file and a vise are used. In this manual operation, the screw is first wrapped in a piece of cloth or the like and fixed in position on the vise so that the crest of the thread 2 will not be damaged. With the screw 1 fixed in this manner, the head 3 is filed along a curvature 6 as illustrated in FIG. 2 (a). By this operation, the coating or plating layer 5 on the head 3 is removed to expose the base metal in the corresponding area.

Thereafter, the head 3 is subjected to rust inhibition treatment. This treatment is carried out by coating the head 3 with a rust inhibitor composition or dipping the whole screw 1 in a rust inhibitor bath. Thereupon, as illustrated in FIG. 3 (a), (b), a rust-resisting film 7 is formed on the head 3 of the set-screw 1.

This procedure provides for a screw head 3 colored and presenting a curved pattern 6. The result is an attractively finished round countersunk head setscrew. Since even the screw carrying a metal plating layer can be provided with such a decoration, a round countersunk head setscrew 1 of intriguing interest can be provided.

Figure 4:
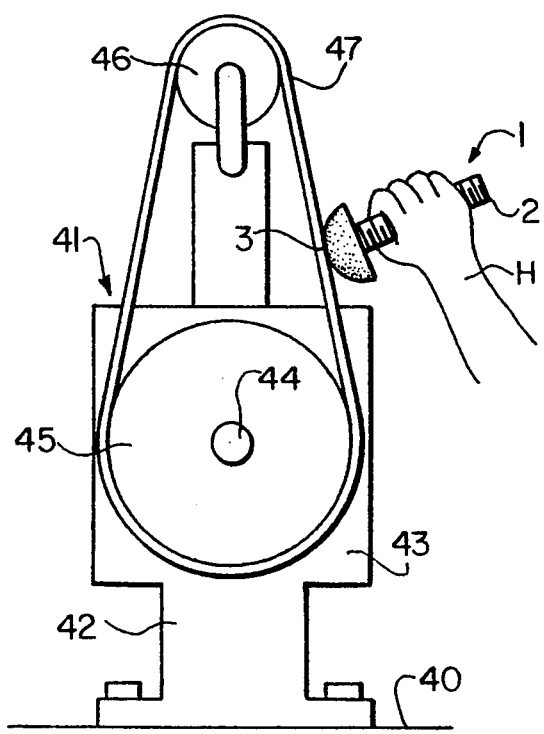
FIG. 4 is a diagrammatic illustration of the grinding operation using a buffing machine according to another embodiment of the invention.
Figure 5:
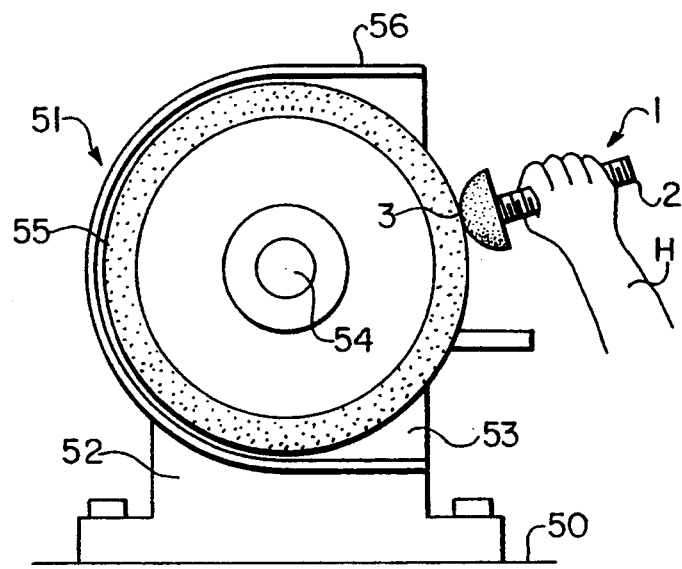
FIG. 5 is a diagrammatic representation of the grinding operation using a grinding machine according to still another embodiment.

FIG. 4 and 5 show machines which can be used for the production of decorative screws in accordance with the invention. FIGS. 4 is a front view of a buffing machine and FIG. 5 is a front view of a grinding machine.

In this process, the head 3 of a round countersunk head setscrew 1 carrying said coating or plating layer 5 is ground to form a decorative pattern. The subsequent rust inhibition and other procedures are similar to those mentioned above and, therefore, will not be described.

The buffing machine 41 shown in FIG. 4 comprises a machine base 40, a machine body 42 mounted rigidly on said base, a motor 43 connected to said machine body 42, a pulley 45 coaxially mounted on a shaft 44 of this motor 43 and a pulley 46 rotatably supported at top of the machine body 42, with a buffing belt 47 thrown over the two pulleys 45, 46.

The grinding machine 51 comprises a machine base 50, a machine body rigidly mounted on said base, a motor 53 connected to said machine body 52, a grinding wheel 55 coaxially mounted on a shaft 54 of said motor 53 and a cover 56 covering said grinding wheel 55.

For the formation of a pattern using said buffering machine 41 or grinding machine 51, the motor 43 or 53 is started, and with the operator holding the thread 2 of said round countersunk head setscrew 1, the head 3 is abutted against the buffing belt 47 or grinding wheel 55. As this operation is carried out selectively according to seven basic routines, any of the seven different patterns shown in FIG. 7 can be formed. Moreover, by applying these routines in a desired combination, the screw head can be formed with any of numerous kinds of patterns such as those illustrated in FIG. 8.

Figure 6:
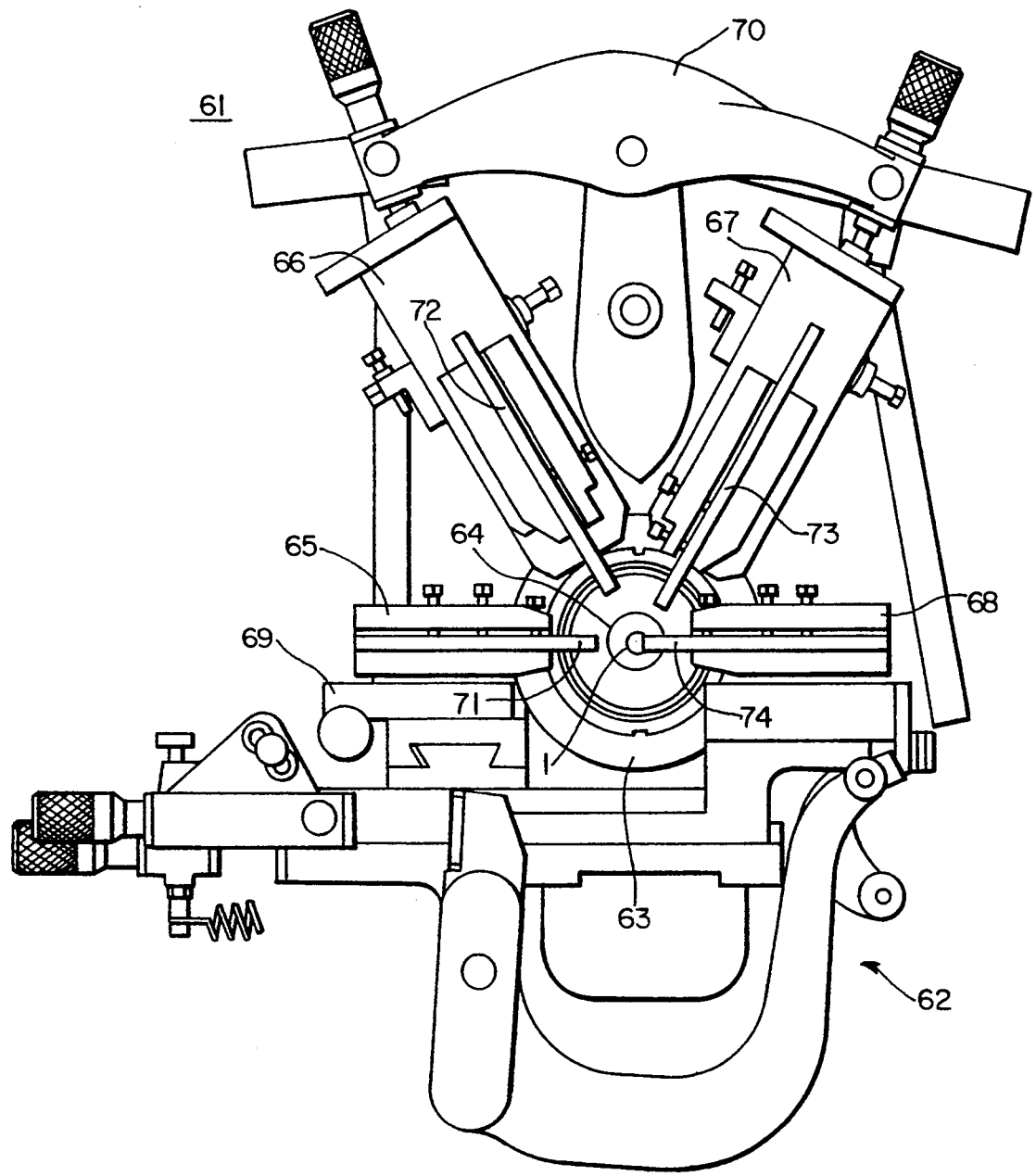
FIG. 6 is a view showing the grinding operation using an automatic lathe according to still another embodiment.
Figure 7A:
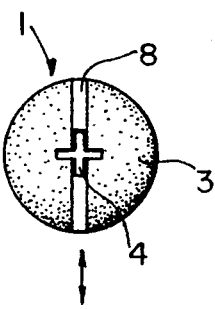
FIG. 7 shows exemplary patterns that can be formed on the head of a round countersunk head setscrew by the basic patterning routines according to the invention.
Figure 7B:
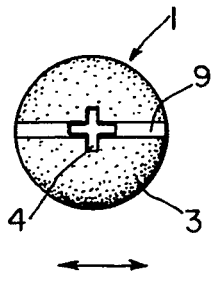
Figure 7C:
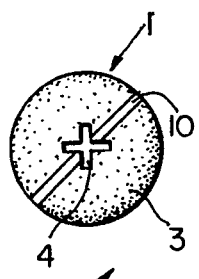
Figure 7D:
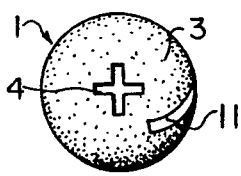
Figure 7E:
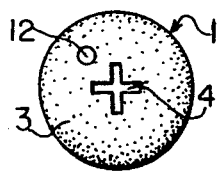
Figure 7F:
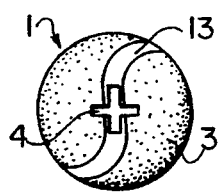
Figure 7G:
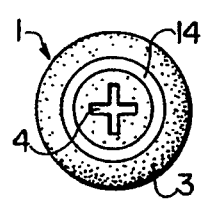

FIG. 6 is a front view of an automatic lathe which can be used in the production of decorative screws according to still another embodiment of the invention.

In this manufacturing process, too, the head 3 of said round countersunk head setscrew 1 which has been formed with a coating or plating layer 5 is machined and, therefore, the procedures corresponding to those described above will not be explained.

This automatic lathe 61 is adapted to automatically machine the work held in position. The lathe 61 includes a control panel having a built-in microcomputer and an operation parameter setting means, which is installed in the vicinity of its machine body 62. The machine body 62 includes a motor 63, which is centrally disposed, while a chuck 64 is mounted through a coupling on the output shaft of said motor 63. The thread 2 of said round countersunk head setscrew 1 is fixed in position by the chuck 64.

Disposed around the motor 63 are four tool holders 65~68 extending towards the chuck 64 at angular pitches of 60 degrees. Each of the tool holders 65, 68 is installed on a machine table in such a manner that it may freely advance and retreat, while each of tool holders 66, 67 is caused to advance or retreat by a rotation mechanism 70. Attached to these tool holders 65~68 are grinding tools 71–74 or cutters corresponding to the patterns to be formed on the head 3.

To form a pattern using this automatic lathe, the microcomputer is first loaded with a program specifying the sequence of action of various parts of the machine so that the desired pattern may be automatically formed.

Now, the thread 2 of the round countersunk head setscrew 1 is fixed in position on the chuck 64 and the tool holders 65~68 are fitted with tools 71–74 which are necessary to form a straight line, a curved line, a dot and a circle, or a desired complicated pattern.

As the automatic lathe 61 is started, the motor 63 rotates the head 3. Then, one of the tool holders 65~68 advances to carry the corresponding tool close to the screw head 3. The order of action of these tool holders 65~68, the advancing or retreating stroke of each tool holder and the close-up distance between the head 3 and each tool are controlled by control signals from the microcomputer.

In this manner, the head 3 of the round counter-sunk head setscrew 1 can be formed with any of the basic patterns illustrated in FIG. 7 just as in the manual operation described hereinbefore. Moreover, by selecting these basic routines in a suitable combination, a large variety of patterns such as those illustrated in FIG. 8 can be obtained. Since the use of this automatic lathe 61 enables a continuous operation, a variety of decorative screws can be manufactured on a mass production scale.

FIG. 7 shows the basic patterns which can be formed by the above-mentioned basic routines. The pattern 8 in FIG. 7 (a) can be formed by vertical cutting; the pattern 9 in (b) by lateral cutting; and the pattern 10 in (c) by oblique cutting. The pattern 11 in (d) can be formed by curved cutting; the pattern 12 in (e) by cutting in a fixed position; the pattern 13 in (f) by S-configured cutting; and the pattern 14 in (g) by circular cutting.

FIG. 8 shows a variety of patterns formed by using the above-mentioned basic routines in combination. The patterns in (a) through (d) can be formed on the head of said round countersunk head setscrew 1 and the patterns in (e) through (g) can be formed on the heads of other types of screws. The pattern in (h) is an exemplary complicated pattern.

The pattern 15 in FIG. 8 (a) represents the idea of rivers or streams, consisting of two curved cuts running through the marginal area of the head. The pattern 16 in (b) represents the idea of waves, consisting of 3 repeating curved cuts each flaring gradually from an approximate center of the head to the margin. The pattern 17 in (c) is symbolic of stars in the night sky. This pattern can be formed by repeating cutting in fixed positions to create a plurality of dots of varying sizes. The pattern 18 in (d) represents the capital letter A of the alphabet. This pattern is formed by cutting two straight lines in two oblique directions and, then, one short line segment in the center.

The pattern 24 in FIG. 8 (e) represents the Arabic figure of 5 cut on the head 22 of a bolt 20 having a slot 23. This pattern is formed by cutting a lateral straight line segment near the margin of the head and a short vertical line segment in continuity with said lateral straight line segment, followed by cutting a circle in continuity with said vertical line segment and interrupting grinding before completion of the circle. The pattern 27, 28 in (f) represents the idea of streams and stars on the head 26 of a hexagonal bolt 25. This pattern consists of two straight lines extending from one side to another side of the hexagonal head and a couple of dots. The pattern 32, 33 in (g) represents the idea of stars on the head 31 of a tease bolt 29. This pattern is formed by cutting two oblique straight lines and, then, a dot in each of the areas defined by the intersecting straight lines. Each of numerals 21, 25 and 30 represents the threaded part.

The pattern 19 in FIG. 8 (h) is the figure of a human being as represented on the head 3 of said round countersunk head setscrew 1. This pattern is formed by applying the actions described above to cut out the head, trunk and four limbs.

The screws and bolts manufactured by the above method are highly decorative and can be used not only as fasteners but also as decorative elements. For example, screws 1 having heads 3 with natural motifs such as streams, waves and stars can be used in eating houses, restaurants, lodges, hotels and mansions as indoor or outdoor decorations. In such applications, the screws, though small in size, may serve as decorative elements for sparkling the atmosphere.

Screws having heads each representing an alphabet letter or an Arabic figure can be utilized as an education aid in elementary schools and may be marketed as "Your Initials" goods in a stationery store or variety shop. Particularly, a broadened usage can be expected by supplying these screws in a wide assortment of sizes and patterns.

Moreover, screws with heads representing human figures can be used in asthetic facilities as guides to various types of sports. They can also be used in general facilities where spaces for gentlemen, ladies and children are preferably differentiated.

Aside from the embodiments described above, the heads of large-sized screws or bolts may each be coated with a luminous paint and formed with an arrowmark in accordance with the invention for use in hospitals or in facilities for the aged. When screws having heads representing arrowmarks are used in the corridors of a hospital or other building, the prominence of the arrowmark at night serves as a guide to an emergency exit in night hours. In the daytime, such screws will impart a gay atmosphere to the monotonous corridor or wall.

Figure 9A:
FIG. 9 is an explanatory view of a further embodiment of the invention.
Figure 9B:
Figure 9C:
Figure 8A:
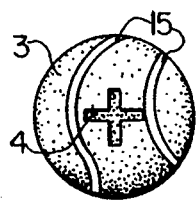
FIG. 8 shows exemplary patterns that can be formed on the head of a screw or bolt according to applied patterning routines of the invention.
Figure 8B:
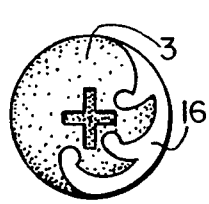
Figure 8C:
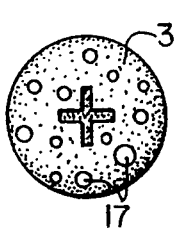
Figure 8D:
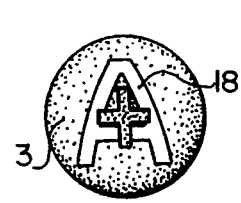
Figure 8E:
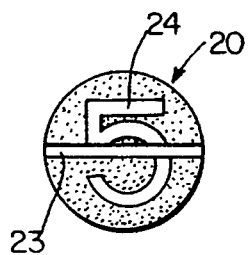
Figure 8F:
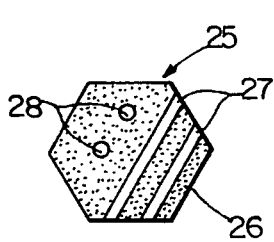
Figure 8G:
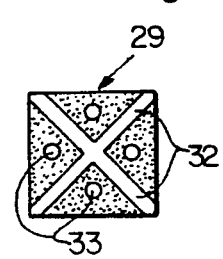
Figure 8H:
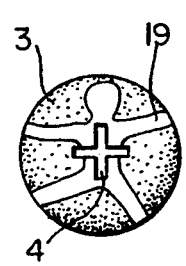

FIG. 9 is a view explaining a still another embodiment of the invention.

In this embodiment, the entire surface of the screw head is first formed with a three-dimensional pattern as illustrated in FIG. 9 (a). This three-dimensional pattern is independent of the cross recess of the head and can be formed by casting or machining.

After this pretreatment, the head is coated or plated. By this treatment, both the projecting and recessed areas of the head are formed with a coating film or a plating layer.

Then, the whole or part of the projecting area of the head is ground. By this operation, the base metal is exposed in the projecting area, while the other area remain coated or plated. Therefore, the ground projecting areas and the colored recessed areas present an interesting mottled pattern.

Finally, the head of the screw is coated with a clear rust inhibitor composition or the whole screw is dipped in a rust inhibitor bath to provide a rust-resisting film.

Since the screw heads can thus be provided with a variety of decorative patterns, whether two-dimensional or three-dimensional, in accordance with the present invention, a wide assortment of decorative screws well-matching with specific environments can be manufactured. Thus, by selecting the optimum screw for each fastening job, the atmosphere of the environment can be effectively improved. Furthermore, when the screw head is provided with a rust-preventive film, the pattern is protected against weathering and can remain attractive for years.

While the pattering of the head of a round countersunk setscrew has been chiefly discussed in the above description of embodiments, such a variety of patterns can of course be formed on the heads of other kinds of screws. Among screws which can be used in the practice of the present invention are flat head setscrews, round flat head setscrews, countersunk head setscrews, round countersunk head screws, pan head setscrews, binding setscrews and truss setscrews. The invention is further applicable to box or cap nuts and bolts, among others.

Of course, the decorative screws that can be manufactured by the method of the invention are not limited to metal screws but include those made of synthetic resins, for instance, and screws which will not be rusted need not be treated with a rust inhibitor.

What is claimed is:

1. A method of manufacturing a decorative screw which comprises forming a three-dimensional pattern comprising recessed and projecting areas on the whole surface of a screw head, covering the whole of said pattern with a film and grinding said film off of the projecting area or areas of said screw head to provide a screw having a head with a three-dimensional decorative pattern.

2. The method according to claim 1 wherein said film is a coating film or a plating layer.

3. A method of manufacturing a decorative screw which comprises forming a three-dimensional pattern comprising recessed and projecting areas on the whole surface of a screw head, covering the whole of said pattern with a film, grinding said film off of the projecting area or areas of said screw head to provide a screw having a head with a three-dimensional decorative pattern, and then applying a rust inhibitor over the whole screw head.

4. The method according to claim 3 wherein said film is a coating film or a plating layer.

5. A method of manufacturing a decorative screw which comprises forming a film on the whole surface of a screw head provided with a slit or cross recess, grinding off a part or parts of said film to provide a pattern and then applying a rust inhibitor over the entire screw head.

6. The method of manufacturing a decorative screw as claimed in claim 5 wherein said film is a coating film or a plating layer.

* * * * *